United States Patent

Kress et al.

[11] Patent Number: 5,968,658
[45] Date of Patent: Oct. 19, 1999

[54] MAGNETIC RECORDING MEDIA

[75] Inventors: Ria Kress, Ludwigshafen; Albert Kohl, Laumersheim; August Lehner, Rödersheim-Gronau; Werner Lenz, Bad Dürkheim; Michael Hitzfeld, Karlsruhe, all of Germany

[73] Assignee: EMTEC Magnetics GmbH, Ludwigshafen, Germany

[21] Appl. No.: 08/982,436

[22] Filed: Dec. 2, 1997

[30] Foreign Application Priority Data

Dec. 12, 1996 [DE] Germany .................. 196 51 672

[51] Int. Cl.⁶ .................................................. G11B 5/702
[52] U.S. Cl. ............................ 428/425.9; 428/694 BU; 428/694 BY; 428/694 BL; 428/900
[58] Field of Search .................. 428/425.9, 694 BU, 428/694 BY, 694 BL, 900

[56] References Cited

U.S. PATENT DOCUMENTS

| | | | |
|---|---|---|---|
| 2,871,218 | 1/1959 | Schollenberger | 260/45.4 |
| 2,899,411 | 8/1959 | Schollenberger | 260/77.5 |
| 4,152,485 | 5/1979 | Mizumura et al. | 428/425 |
| 4,320,171 | 3/1982 | Motz et al. | 428/423.1 |
| 4,477,531 | 10/1984 | Kohler et al. | 428/425.9 |
| 4,567,108 | 1/1986 | Lehner et al. | 428/425.9 |
| 4,568,610 | 2/1986 | Lehner et al. | 428/425.9 |
| 4,568,612 | 2/1986 | Lehner et al. | 428/425.9 |
| 4,686,145 | 8/1987 | Honda et al. | 428/425.9 |
| 5,525,418 | 6/1996 | Hashimoto et al. | 428/323 |
| 5,543,226 | 8/1996 | Bobrich et al. | 428/423.1 |
| 5,552,229 | 9/1996 | Brodt et al. | 428/425.9 |
| 5,756,637 | 5/1998 | Brodt et al. | 528/71 |

FOREIGN PATENT DOCUMENTS

| | | |
|---|---|---|
| 0 601 472 A1 | 12/1993 | European Pat. Off. |
| 691 644 | 6/1995 | European Pat. Off. |
| 3814536 | 4/1988 | Germany . |
| 57-92421 | 6/1982 | Japan . |
| 63-275024 | 11/1988 | Japan . |

OTHER PUBLICATIONS

Ullmann's Encyclopedia of Ind. Chem., 5 ed., vol. A14, pp. 179–183, 1989.

Primary Examiner—Stevan A. Resan
Attorney, Agent, or Firm—Keil & Weinkauf

[57] ABSTRACT

Magnetic recording media contain a nonmagnetic substrate and a magnetizable layer, the magnetizable layer containing ferromagnetic pigments and a system of polymeric materials, wherein the system of polymeric materials contains a) from 3 to 35% by weight of a polymer containing ionic or ionogenic groups b) from 5 to 97% by weight of a polymer XIV which contains basic groups, and has a molecular weight of from 30000 to 2000000.

2 Claims, No Drawings

MAGNETIC RECORDING MEDIA

The present invention relates to magnetic recording media which contain a nonmagnetic substrate and a magnetizable layer, the magnetizable layer containing ferromagnetic pigments and a system of polymeric materials.

Magnetic recording media which contain a nonmagnetic substrate and a magnetizable layer, the magnetizable layer containing ferromagnetic pigments and a polymeric material, are generally known, for example from Ullmann's Encyclopedia of Industrial Chemistry, 5th Edition, Vol. A14, pages 179–183, VCH Publishers Inc., Weinheim-New York, 1989.

Such magnetic recording media were having to meet increasingly high requirements with regard to quality of the recording and of the reproduction and the aging resistance. The polymeric materials in which the ferromagnetic pigments are dispersed are becoming increasingly important for meeting these requirements. Attempts are being made to improve the stability of the magnetic dispersions, to avoid the formation of defects on the magnetic layer and, for improving the magnetic properties, in particular the residual induction, to achieve higher packing density of the ferromagnetic pigments in the layer, which is achievable by reducing the proportion of the polymeric materials in the magnetic layer. Attempts are also being made to achieve an improved signal/noise ratio and a very narrow switching field distribution through the use of increasingly finely divided ferromagnetic pigments having a pronounced and extremely uniform acicular shape. Furthermore, the pigments are very often surface-modified to increase the shelf life.

These measures make it more difficult both to divide the pigments in the dispersing process and to achieve good dispersion stability. Moreover, the magnetic layers must be very flexible, must have high resilience and must possess high tensile strength. In addition, a reduction in the coefficients of friction and an increase in the abrasion resistance and wear resistance of the magnetic layer are increasingly being required in order to avoid drops in output level. These mechanical properties must also be ensured at high temperature, in particular at about 80° C., and high atmospheric humidity, for example 100% relative humidity at about 40° C.

In order to achieve these properties, particular attention was paid to the choice of the polymeric materials. Polyurethane elastomers, in particular polyesterurethanes, as described, for example, in DE-B 11 06 959, DE-A 27 53 694, EP-A 69 955 and U.S. Pat. No. 2,899,411, have proven particularly useful. Combinations of polymeric materials are also known, for example combinations of a high molecular weight polyurethane or a polyurethane containing OH and urea groups and a polyurethane containing an acrylate or methacrylate group and urea groups from DE-A 41 41 839 and the prior German Application P 44 24 261.1. However, such combinations have the disadvantage of poor dispersion stability at high loads. Combinations of three polymeric materials, for example combinations of a high molecular weight linear polyurethane, a polyurethane containing OH and urea groups and a polymeric material selected from the group consisting of vinyl copolymers, phenoxy resins and cellulose derivatives from EP-A 142 796 and EP-A 142 798 are also known.

However, the stated polymeric materials and combinations of polymeric materials cannot adequately meet the requirements described. In many cases, the wetting and dispersing of the pigments, in particular very finely divided ferromagnetic pigments, is adversely affected so that any sintered material is not sufficiently divided up in the dispersing process or reagglomeration of the pigment particles is not sufficiently prevented, leading to poor magnetic properties of the recording medium. For this reason, low molecular weight dispersants were added to the dispersion in relatively small amounts to facilitate the dispersing process. However, the dispersants had certain disadvantages. Thus, low molecular weight dispersants may be readily exuded under unfavorable climatic conditions, such as high atmospheric humidity and/or temperature, with the result that deposits occur on all tape-guiding parts, in particular on the head, in recording or playback units, resulting in drops in output level. Moreover, the friction is increased with the result that the magnetic recording medium may block during the passage through a unit.

On the other hand, when these dispersants are used, compatibility problems may occur in the dispersion. Since the dispersants contain polar groups, the hydrophilic character of the layer increases considerably, which may result in swelling of the layer, exudation of the dispersants and lubricants and other mechanical changes in the presence of humidity and high temperature. The incorporation of polar groups into polyurethanes has been proposed for improving the dispersing properties of such polymeric materials. For example, DE-A 28 33 845 discloses the incorporation of polyesters having polar groups. Incorporation of diols which additionally carry polar groups is described, for example, in JP-A 57-092 421, DE-A 38 14 536 and EP-A 193 084. Such dispersants divide up the pigments very well but, particularly in the case of ferromagnetic pigments having a large specific surface area (BET surface area), lead to dispersions having very disadvantageous rheological properties, such as high flow limit and high viscosity, so that the processing and the casting of these dispersions to give magnetic layers entails considerable difficulties. Furthermore, the content of ionogenic groups having dispersant activity in the dispersant is limited to a maximum concentration since otherwise adverse effects, such as bridging flocculation, occur. An increase in the pigment volume concentration on the one hand and a reduction in the particle size of the pigments on the other hand are no longer compatible with the required content of dispersing resin but contrary thereto.

A substantial improvement in the mechanical properties of magnetic recording media was achievable by means of OH-containing polyurethanes, as described, for example, in EP-A 99 533. However, these measures are not sufficient to meet the continuously increasing requirements with regard to the mechanical and magnetic properties of magnetic recording media.

A substantial improvement in the dispersing properties was achieved by adding a polyurethane containing an acrylate or methacrylate group and urea groups to the matrix comprising polymeric materials, as described, for example, in DE-A 41 41 839. The disadvantage here is that a coating shock occurs, particularly where the magnetic dispersion is prepared by multistage processes with feeding of further components; moreover, the prepared dispersions tend to flocculate or reagglomerate on prolonged storage, flocculation or reagglomeration being evident from defects in the magnetic layer. Mixtures of polymeric materials, for example, as stated, combinations of resilient polyurethanes with hard segments, for example polyvinyl chloride, are therefore very frequently used for the production of magnetic recording media. However, these polymeric materials have only limited compatibility with polyurethanes which contain an acrylate or methacrylate group and urea groups.

It is an object of the present invention to provide magnetic recording media whose dispersions required for the preparation are stable even over a prolonged period and which have a low flow limit, in order to produce therefrom magnetic recording media which are distinguished by improved wear resistance, in particular under conditions of high temperature and humidity, high residual induction, a narrow switching field distribution, a layer surface with few defects and improved magnetic properties, in particular in the storage of digital data.

We have found that this object is achieved by magnetic recording media I containing a nonmagnetic substrate II and a magnetizable layer III, the magnetizable layer III containing ferromagnetic pigments IV and a system of polymeric materials V, wherein the system of polymeric materials V contains a) from 3 to 35% by weight of a polymer VI obtainable by reacting
  1) a polymer VII of
    a) from 80 to almost 100 mol % of a $C_1$–$C_{25}$-alkyl ester of an α,β-unsaturated carboxylic acid,
    b) from 0 to 20 mol % of one or more further monomers and
    c) an initiator and/or regulator, by means of which the majority of the polymer chains of the polymer VII are terminated at one of their ends by a hydroxyl group,
  2) with a polyfunctional nonaromatic isocyanate VIII to give a reaction product IX, the amount of isocyanate groups being from 1.2 to 3.9 mol per mole of hydroxyl groups of VII,
  3) reacting IX with
    a) a compound X containing groups reactive toward isocyanates to give a reaction product XI, the amount of reactive groups being from 2 to 7 mol per mole of the free isocyanate groups still present in IX, and reacting XI with a compound XII to give the polymer VI, which reacts with the still free reactive groups in XI and by means of which ionic or ionogenic groups are introduced into XI, or
    b) a compound XIII which contains groups reactive toward isocyanates and by means of which ionic or ionogenic groups are introduced into IX, to give the polymer VI and
b) from 5 to 97% by weight of a polymer XIV which contains basic groups, has a molecular weight of from 30000 to 2000000 and is obtainable by reacting
  1) a polymeric diol XV having a number average molecular weight of from 400 to 10000 with
  2) from 0.3 to 1 mol, per mole of the diol XV, of a mixture of XVI comprising
    a) at least one diol XVII of 2 to 18 carbon atoms and
    b) a diol XVIII,
      b1) which contains at least one basic group or
      b2) into which a basic group can be introduced by reaction with a compound XIX,
  3) from 0.01 to 1 mol, per mole of the diol XV, of a polyhydric alcohol XVII having at least three OH groups and 3 to 25 carbon atoms,
  4) from 1.3 to 13 mol, per mole of the diol XV, of a diisocyanate XVIII of 6 to 30 carbon atoms and
  5) from 0.09 to 2 mol, per mole of the diol XV, of an amino alcohol XIX of 2 to 16 carbon atoms, the ratio of the sum of OH groups of the compounds XV, XVI and XVII to the NCO groups of the compound XVIII to the amine groups of the compound XIX being 1:1.03–1.3:0.03–0.3, and the sum of the amounts by weight of the polymers VI and VII in the system V being from 40 to 100% by weight.

Suitable monomers (a) of which the polymers VII are for the most part composed are primarily esters of α,β-unsaturated carboxylic acids of the formula

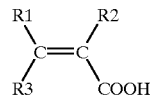

where $R^1$, $R^2$ and $R^3$ are each hydrogen or $C_1$–$C_4$-alkyl, acrylic acid and methacrylic acid being preferred. Mixtures of esters of different such carboxylic acids may also be used.

Suitable alcohol components of the alkyl esters, in addition to the $C_9$–$C_{25}$-alkanols, such as nonanol, stearyl alcohol and lauryl alcohol, are preferably the $C_1$–$C_8$-alkanols, in particular methanol and n-butanol, and mixtures of different such alkanols.

Suitable further comonomers (b) for the synthesis of the polymers VII are up to 20, preferably from 0 to 5, mol % of those monomers which modify, but not significantly change, the mechanical, thermal and chemical properties of the polymers composed only of the monomers (a).

Such monomers are, for example, olefinically unsaturated aromatic hydrocarbons, such as styrene and α-methylstyrene, unsaturated nitriles, such as acrylonitrile and methacrylonitrile, halogenated olefins, such as vinyl chloride, vinyl alcohol derivatives, such as vinyl acetate and in particular monoesters of the stated α,β-unsaturated carboxylic acids with polyhydric alcohols, such as ethanediol, propane-1,2-diol, propane-1,3-diol, the butanediols, glycerol and mixtures of these alcohols.

Small amounts of bifunctional monomers which produce slight crosslinking of the polymers without influencing their properties as thermoplastics are also suitable, for example butadiene, divinylbenzene and the polyesters of α,β-unsaturated carboxylic acids with the abovementioned polyhydric alcohols.

According to the invention, the polymer chains of VII should be terminated by a hydroxyl group. This is achieved by means of initiators which give a hydroxyl radical (OH radical) on decomposition and/or by means of regulators which contain a hydroxyl function.

Initiators of this type are, for example, tert-butyl hydroperoxide, tetrahydrofuran hydroperoxide, cumyl hydroperoxide and 2,2'-azobis(2-methyl-N-(2-hydroxyethyl)propionamide).

If the hydroxyl group is introduced only by means of a regulator, other initiators may also be used, for example azobisisobutyronitrile, di-tert-butyl peroxide, didodecanoyl peroxide, dibenzoyl peroxide, tert-butyl peracetate or tert-butyl 2-methylperpropionate.

Suitable regulators are amino alcohols, aminophenols and in particular thioalkanols, such as 3-hydroxypropanethiol, 2-hydroxyethyl 3-mercaptopropionate and in particular 2-hydroxyethanethiol (mercaptoethanol).

Mixtures of different initiators and/or regulators may also be used.

Initiators and regulators are used in the conventional amounts, as a rule from 0.1 to 4.8% by weight and from 0.1 to 5% by weight, respectively, based on the mixture of the monomers (a) and (b) used. Since the proportion of those terminal groups of the polymer chains which originate from the initiators or regulators is only from about 0.05 to 5 mol %, for greater clarity these amounts were omitted when stating the quantitative composition of the polymer VII.

The polymers VII can be prepared by all known polymerization methods, for example by mass polymerization, emulsion polymerization and, preferably, solution polymerization.

Suitable solvents are esters, such as ethyl acetate, hydrocarbons, such as toluene, and in particular cyclic ethers, such as tetrahydrofuran and dioxane.

The polymerization is carried out as a rule at elevated temperatures, preferably at from 40 to 125° C., resulting in reaction times of from 2 to 7 hours.

The polymers VII can be isolated from the reaction mixture by known methods, for example by extraction or precipitation, or can preferably be used for further processing without isolation.

For the preparation of the reaction products IX, a polymer VII is reacted with a polyfunctional nonaromatic isocyanate VIII or with a mixture of such isocyanates, the amount of isocyanate groups being from 1.2 to 3.9, preferably from 2.0 to 3.2, mol per mole of the hydroxyl groups of VII. The amount of hydroxyl groups in the prepared polymer VII corresponds as a rule to a hydroxyl number of from 5 to 20 mg of KOH/g of VII (according to DIN 53240), which in turn corresponds to from 0.085 to 0.34 mmol of hydroxyl groups per gram of VII.

Advantageously, open-chain isocyanates, such as 1,6-diisocyanatohexane, cyclic isocyanates, such as 1,3-di(isocyanatomethyl)cyclohexane, oligomeric urea derivatives carrying free isocyanate groups, for example reaction products of 3 mol of 1,6-diisocyanatohexane and 1 mol of water, or oligomeric urethanes carrying free isocyanate groups may be used as polyfunctional, nonaromatic isocyanates.

The preparation of IX by reaction of VII with VIII can advantageously be carried out in the solvents suitable for the preparation of VII.

The reaction can be carried out without a catalyst or, preferably, in the presence of a catalyst, such as a tertiary amine, in particular triethylamine, a metal salt, in particular tin octoate or lead octoate, or an organometallic compound, in particular dibutyltin dilaurate or titanium tetramethylate.

The reaction is carried out as a rule at elevated temperatures, preferably at from 60 to 125° C., corresponding to reaction times of from about 0.2 to 5 hours.

The reaction products IX can be isolated from the reaction mixture by known methods, for example extraction or precipitation, or preferably can be used for further processing without isolation.

For the preparation of the reaction products XI, the reaction product IX is reacted with a compound X containing groups reactive toward isocyanates or with a mixture of such compounds. The number of free isocyanate groups may be determined according to DIN EN 1242.

Suitable groups reactive toward isocyanates are many classes of substances, for example mercaptans, alcohols or amines. It is possible to use compounds X which contain a plurality of identical or different groups of this type.

Examples of such compounds are, as generally known, mercaptans, such as 1,2-thioglycol, thioalcohols, such as 2-mercaptoethanol, thioamines, such as (2-mercaptoethyl)-methylamine, alcohols, such as 1,2-propanediol, glycerol or 2,2-di(hydroxymethyl)-1-butanol, amino alcohols, such as aminoethanol, N-methylaminoethanol, 4-(3-aminopropyl)benzyl alcohol or N-(3-hydroxypropyl)piperidine, and polyfunctional, in particular nonaromatic amines as well as ammonia and water.

Advantageously, open-chain amines, such as ethylenediamine, diethylenetriamine or in particular triethylenetetramine, or cyclic amines, such as piperazines or 4-aminopiperidines, in particular 2,2,5,5-tetramethyl-4-aminopiperidine, or poly-cyclic amines may be used as polyfunctional, nonaromatic amines.

Such amines are generally known.

Amines of the formula

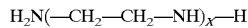

$$H_2N(-CH_2-CH_2-NH)_x-H \qquad Xa$$

where x is from 2 to 6, or of the formula

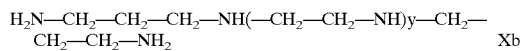

$$H_2N-CH_2-CH_2-CH_2-NH(-CH_2-CH_2-NH)y-CH_2-\\ CH_2-CH_2-NH_2 \qquad Xb$$

where y is from 0 to 4, have proven particularly advantageous.

The compounds Xa are obtainable in a manner known per se, by oligomerization of ethyleneimine in the presence of ammonia, and the compounds Xb can be prepared by reacting 2 mol of acrylonitrile with 1 mol of ammonia or with a compound Xa and subsequently hydrogenating the nitrile functions.

The reaction can be carried out in the presence of a catalyst, such as a tertiary amine, in particular tributyl-amine or 1,4-diazabicyclo[2.2.2]octane, or an organometallic compound, in particular dibutyltin dilaurate, in amounts of from 1 to 500, in particular from 1 to 50, ppm by weight, based on IX, or preferably without a catalyst.

The preparation of XI by reaction of IX with X can be carried out in the absence of a solvent or, advantageously, in the presence of an organic solvent, such as a hydro-carbon, in particular toluene or cyclohexane, an ester, in particular ethyl acetate, an ether, in particular diiso-propyl ether or methyl tert-butyl ether, or preferably a cyclic ether, in particular tetrahydrofuran or dioxane.

Water is also suitable in some cases.

The reaction is carried out as a rule at from 10 to 70° C., preferably from 20 to 40° C., resulting in reaction times of from about 0.1 to 2 hours.

The reaction products XI can be isolated from the reaction mixture by known methods, for example by extraction or precipitation, or can preferably be used for further processing without isolation.

For the preparation of the polymers VI, the reaction product XI is reacted with a compound XII which reacts with the still free reactive groups in XI and by means of which acidic groups are introduced into XI, or with mixtures of such compounds. The number of free reactive groups may be determined according to DIN 53176 in the case of the amino groups and according to DIN 53240 in the case of the hydroxyl groups.

Suitable substances XII reacting with the reactive groups are many classes of substances, for example alkyl halides, amides, epoxides, esters, ketones or isocyanates, which carry in the molecule one or more acidic group or groups readily converted into acidic groups.

Acidic groups are in particular sulfonic acid, phosphonic acid and phosphoric acid groups and in particular carboxyl groups or salts, for example ammonium salts or alkali metal salts, such as sodium or potassium salts, of such acidic groups.

Examples of such compounds are alkyl halides, such as chloroacetic acid, amides, such as succinic acid monoamide, epoxides, such as glycidyl acid, esters, such as monomethyl phthalate, and ketones, such as acetylacetic acid.

Particularly suitable compounds XII are the internal anhydrides of polybasic carboxylic acids, such as maleic anhydride, succinic anhydride, phthalic anhydride and adipic anhydride, which, for example with amino groups of XI, form amido groups which are substituted by a carbonyl group.

In the case of hydroxyl groups as reactive groups, inorganic acids, in particular mineral acids, such as phosphoric acid, and the oligomers and polymers of such acids, or derivatives, such as esters or salts of such acids, by means of which acidic groups are introduced into the compound XI, or mixtures of such compounds may advantageously be used as compound X, in addition to the stated carboxylic acids and carboxylic acid derivatives.

These compounds are reacted in a manner known per se with the reactive groups of the polymers XI.

The preparation of VI by reaction of XI with XII can be carried out in the absence of a solvent or, advantageously, in the presence of an organic solvent, such as a hydrocarbon, in particular toluene, cyclohexane or hexane, an ester, in particular ethyl acetate, an ether, in particular diisopropyl ether or methyl tert-butyl ether, or preferably a cyclic ether, in particular tetrahydrofuran or dioxane. Water is also suitable in some cases.

The reaction is carried out as a rule at from 10 to 60° C., preferably from 20 to 40° C., resulting in reaction times of from about 0.1 to 1.5 hours.

With the use of inorganic acids, in particular mineral acids, such as phosphoric acid or sulfuric acid, or the oligomers or polymers of such acids, or of derivatives, such as esters or salts of such acids, by means of which acidic groups are introduced into the compound XI, or mixtures of such compounds as compound X, the reaction can be carried out as described or advantageously in a manner known per se in the presence of a solvent which forms an azeotropic mixture with water. Examples of suitable solvents of this type are aromatics, such as benzene or toluene. Mixtures of such solvents may also be used.

The reaction is carried out as a rule at the boiling point established under the corresponding pressure, resulting in reaction times of from about 1 to 10 hours.

The polymer VI can be isolated from the reaction mixture by known methods, for example extraction or precipitation. However, the reaction mixture is preferably used directly for the production of the magnetic recording media.

For the preparation of the polymer VI, the compound IX can be reacted, according to the invention, with a compound XIII which has at least one group reactive toward isocyanates and which carries one or more ionic or ionogenic groups in the molecule. Mixtures of different compounds XIII may also be used.

Suitable compounds having groups which are reactive toward isocyanates are many classes of substances, for example mercaptans or alcohols or amines and ammonia. Compounds XIII which contain a plurality of identical or different groups of this type may also be used.

Acidic groups are in particular the sulfonic acid, phosphonic acid, phosphoric acid and in particular carboxyl groups.

Groups which are readily converted into acidic groups are, for example, the ester group or salts, preferably of the alkali metals, such as sodium or potassium.

Examples of such compounds XIII are hydroxycarboxylic acids, such as citric acid, hydroxymethylsuccinic acid, 6-hydroxy-caproic acid or 12-hydroxydodecanoic acid, aminocarboxylic acids, such as aminovaleric acid, mercaptocarboxylic acids, such as mercaptosuccinic acid, phosphoric acid derivatives, preferably hydroxyalkyl phosphates, such as mono(2,3-bis-(hydroxymethyl)butyl) phosphate or esters of oligoethylene glycol with phosphoric acid, aminoalkyl phosphates, such as phosphoric acid mono(2-aminoethyl)ester sodium salt, phosphonic acid derivatives, preferably hydroxyalkyl phos-phonates, such as diethyl bis(N-2-hydroxyethyl) aminoethyl-phosphonate, aminoalkyl phosphonates, such as diethyl 3-aminopropylphosphonate, or sulfonic acid derivatives, preferably hydroxysulfonic acids, such as 3-hydroxypropane-sulfonic acid, or aminosulfonic acids, such as N-methyl-taurine.

Basic groups are in particular amino groups.

Examples of such compounds XIII are ammonia and poly-functional, nonaromatic amines, advantageously open-chain amines, such as ethylenediamine, diethylenetriamine or in particular triethylenetetramine, or cyclic amines, such as piperazines or 4-aminopiperidines, in particular 2,2,5,5-tetramethyl-4-aminopiperidine, or polycyclic amines.

Such amines are generally known.

Amines of the formula

$$H_2N(-CH_2-CH_2-NH)_x-H \qquad Xa$$

where x is from 2 to 6, or of the formula

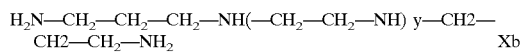

$$H_2N-CH_2-CH_2-CH_2-NH(-CH_2-CH_2-NH)_y-CH2-CH2-CH_2-NH_2 \qquad Xb$$

where y is from 0 to 4, have proven particularly advantageous.

The compounds Xa are obtainable in a manner known per se, by oligomerization of ethyleneimine in the presence of ammonia, and the compounds Xb can be prepared by reacting 2 mol of acrylonitrile with 1 mol of ammonia or with a compound Xa and subsequently hydrogenating the nitrile functions.

The reaction can be carried out in the presence of catalysts, for example a tertiary amine, such as tributylamine or 1,4-diazabicyclo[2.2.2]octane, or, for example, an organometallic compound, such as dibutyltin dilaurate, in amounts of from 1 to 500, in particular from 1 to 50, ppm by weight, based on IX, or preferably without a catalyst.

The preparation of VI by reaction of IX with XIII can be carried out in the absence of a solvent or, advantageously, in the presence of an organic solvent. Suitable solvents are hydrocarbons, in particular toluene and cyclohexane, esters, in particular ethyl acetate, ethers, in particular diiso-propyl ether and methyl tert-butyl ether, and preferably cyclic ethers, in particular tetrahydrofuran and dioxane. Water is also suitable in some cases.

The reaction is carried out as a rule at from 10 to 70° C., preferably from 20 to 60° C., resulting in reaction times of from about 0.1 to 2 hours.

A preferred diol XV is a polyesterol, polyetherol or polycarbonate having a molecular weight of from 400 to 10000, in particular from 500 to 2500, and mixtures of such compounds. The diols are advantageously predominantly linear polymers having two terminal OH groups. The polyesterols can be prepared in a simple manner by esterifying aliphatic or aromatic dicarboxylic acids of 4 to 15, preferably 4 to 8, carbon atoms with aliphatic or cycloaliphatic diols, preferably of 2 to 20 carbon atoms, or by polymerizing a lactone of 3 to 10 carbon atoms. Examples of suitable dicarboxylic acids are glutaric acid, pimelic acid, suberic acid, sebacic acid, dodecanoic acid, isophthalic acid, phthalic acid, preferably adipic acid, succinic acid and terephthalic acid. The dicarboxylic acids may be used individually or as a mixture. For the preparation of the polyesterols, it may be advantageous to use the corresponding acid derivatives, such as carboxylic anhydrides or carbonyl chlorides, instead of the dicarboxylic acids. Examples of suitable diols are diethylene glycol, pentanediol, 1,10-decanediol and 2,2,4-trimethylpentane-1,5-diol, in particular 1,2-ethanediol, 1,4-butanediol, 1,6-hexanediol, 2,2-dimethylpropane-1,3-diol, 1,4-dimethylol-cyclohexane, 1,4-diethanolcyclohexane and 1,4-diethanol-propane. Examples of suitable lactones for the preparation of the polyesterols are 2,2-dimethylpropio-3-lactone, butyrolactone and preferably caprolactone. Preferred polycarbonates are generally based on 1,6-hexanediol.

Suitable polyetherols are essentially linear substances which have terminal hydroxyl groups, contain ether bonds and have a molecular weight of, preferably, from 600 to 4000, in particular from 1000 to 2000. Particularly suitable polyetherols can readily be prepared by polymerization of cyclic ethers, such as tetrahydrofuran, or by reaction of one or more alkylene oxides where the alkylene radical is of 1 to 24 carbon atoms with an initiator molecule which contains two active hydrogen atoms bonded in the alkylene radical. Examples of alkylene oxides are ethylene oxide, 1,2-propylene oxide, epichlorohydrin, 1,2-butylene oxide and 2,3-butylene oxide. The alkylene oxides may be used individually, alternately in succession or as a mixture. Examples of suitable initiator molecules are water, glycols, such as ethylene glycol, propylene glycol, 1,4-butanediol and 1,6-hexanediol, amines, such as ethylenediamine, hexamethylenediamine and 4,4'-diaminodiphenylmethane, and amino alcohols, such as ethanolamine. As in the case of polyesterols, the polyetherols too may be used alone or as a mixture.

Diols XVI used may be aliphatic diols of 2 to 10, preferably 4 to 6, carbon atoms, for example 1,2-ethanediol, 1,3-propanediol, 1,4-butanediol, 1,6-hexanediol, 1,5-pentanediol, 1,10-decanediol, 2-methyl-2-butyl-1,3-propanediol, 2,2-dimethyl-1,4-butanediol, neopentylglycol hydroxypivalate, diethylene glycol, triethylene glycol, 1,4-dimethylolcyclohexane or 1,4-diethanolcyclohexane, or aromatic diols, such as ethylene or propylene adducts of bisphenol A or ethylene oxide adducts of hydroquinone.

The diols may be used individually or as a mixture. In minor amounts, it is also possible to use diamines of 2 to 15 carbon atoms, such as ethylenediamine, 1,6-hexamethylenediamine, 4,9-dioxododecane-1,12-diamine or 4,4'-diaminodiphenylmethane or amino alcohols, such as monoethanolamine, monoisopropanolamine and 2-amino-2-methylpentan-2-ol. Here, it has proven advantageous to incorporate the resulting urea groups into the polymer chain. The urea groups at the chain end are of minor importance here.

Some or all of the stated diols may also be replaced by water, in the same way as the compound XVI.

Suitable polyhydric alcohols XVII are primarily triols of 3 to 10, preferably 3 to 6, carbon atoms, such as glycerol or trimethylolpropane. Low molecular weight reaction products of a polyhydric alcohol, such as trimethylolpropane, with an alkylene oxide, such as ethylene oxide or propylene oxide, are also suitable. As alcohols having a larger number of hydroxyl groups, it is possible to use, for example, erythritol, pentaerythritol and sorbitol.

Suitable diisocyanates XVIII are primarily aliphatic, cycloaliphatic or aromatic diisocyanates of 6 to 30 carbon atoms. Toluylene 2,4-diisocyanate, toluylene 2,6-diisocyanate, m-phenylene diisocyanate, 4-chloro-1,3-phenylene diisocyanate, 1,5-naphtylene diisocyanate, 1,5-hexamethylene diisocyanate, 1,6-hexamethylene diisocyanate, 1,4-cyclohexylene diisocyanate, 1,5-tetrahydronaphthylene diisocyanate, 4,4'-diphenylmethane diisocyanate, dicyclohexylmethane diisocyanate, isophorone diisocyanate of the formula

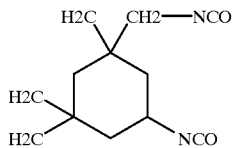

and mixtures of such compounds are particularly suitable.

Suitable compounds XIX are primarily amino alcohols of 2 to 16, preferably 3 to 6, carbon atoms, such as dimethylethanolamine, preferably diolamines, such as ethyldiisopropanolamine and N-bis(2-hydroxyethyl)aniline, in particular methyldiethanolamine and methyldiisopropanolamine.

Furthermore, OH-free monoamines of 2 to 16 carbon atoms, such as alkylmonoamines, dialkylmonoamines or diphenyl-amines, in particular dibutylamine, may be used in amounts of up to 1 mol per mole of the compound XIX, based on the amino groups reactive toward isocyanates.

The ratio of the components XV to XVIII should be from 1.3 to 13 mol of diisocyanate XVIII per mole of diol XV when from 0.3 to 10 mol of the diol XVI and from 0.05 to 0.5 mol of polyhydric alcohol XVII are used. For practical reasons, it may be advantageous to use a diisocyanate in an excess of at least 3% over the amount required for complete reaction of the reactants, so that the ratio of the number of isocyanate groups used to the number of hydroxyl groups in the reaction mixture is from 1.03 to 1.3, preferably from 1.05 to 1.15. The NCO excess can then be reacted stoichiometrically with the amino groups of the compound XIX, so that the molar ratio of components XV, XVI and XVII to XVIII to XIX is 1:1.03–1.3:0.03–0.3, preferably 1:1.05–1.15:0.05–0.15.

The polymeric materials may be prepared in the absence of a solvent, preferably in the presence of a liquid diluent, if required in the presence of a catalyst or further assistants.

Suitable liquid diluents are aromatics, such as toluene and xylene, esters, such as ethyl acetate and butyl acetate, ketones, such as cyclohexanone and methyl ethyl ketone, amides, such as dimethylformamide and N-methylpyrrolidone, sulfoxides, such as dimethyl sulfoxide, and preferably in particular cyclic ethers, such as tetrahydrofuran and dioxane, and mixtures of such diluents.

Examples of suitable catalysts are amines, such as triethylamine, triethylenediamine, N-methylpyridine and N-methylmorpholine, metal salts, such as tin octoate, lead octoate and zinc stearate, and organic metal compounds, such as dibutyltin dilaurate. The optimum amount of catalyst is dependent on the efficiency of the catalyst used. In general, it has proven advantageous to use from 0.005 to 0.3, preferably from 0.01 to 0.1, part by weight per 100 parts by weight of the sum of the compounds XV to XIX.

Primarily two processes are suitable for the preparation of the polymeric materials XIV.

A mixture of a diluent, the compounds XV, XVI and XVII and, if required, a catalyst or further assistants may be added to a mixture of a liquid diluent and a compound XVIII at from 20 to 90° C., preferably from 30 to 70° C., in the course of from 0.2 to 5 hours.

Furthermore, it is possible to mix the compounds XV to XVIII with a diluent, the amount of the compounds XV to XVIII advantageously being from 15 to 50% by weight, based on the total mixture. The stirred mixture can then be heated to 20–99° C., preferably 30–70° C., if necessary with the addition of a catalyst or further assistants, and a compound XIX may then be added.

The polymeric materials XIV may be isolated from the mixture by known methods, such as extraction or precipitation. Preferably, however, the mixture is used directly for the production of magnetic recording media.

The system V contains, according to the invention, from 3 to 35% by weight of a polymer VI and from 5 to 97% by weight of a polymer XIV, the sum of the amounts by weight of the polymers VI and XIV in the system V being from 40 to 100% by weight. The system V may contain up to 60% by weight of at least one further polymeric material XCX, preferably one without ionic groups. Systems V consisting of from 5 to 25% by weight of at least one material VI, 15–60% by weight of at least one material XIV and 15–60% by weight of at least one material XCX are particularly advantageous.

Materials XCX, in particular physically drying binders, are known per se. Polyvinyl formal binders which can be prepared by hydrolyzing a polymer of a vinyl ester and then reacting the polyvinyl alcohol with formaldehyde are suitable. The polyvinyl formals should advantageously have a vinyl formal group content of at least 65, preferably at least 80, % by weight. Polyvinyl formals containing from 5 to 13% by weight of vinyl alcohol groups and from 87 to 95% by weight of vinyl formal groups and having a density of 1.2 and a viscosity of from 50 to 120 mpa.s, measured at 20° C. in a solution of 5 g of polyvinyl formal in 100 ml of 1:1 w/w phenol/toluene, are particularly suitable.

In addition to polyvinyl formal, copolymers of vinyl chloride and mono- or diesters of diols and α,β-unsaturated carboxylic acids of the formula

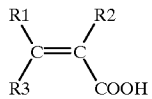

where $R^1$, $R^2$ and $R^3$ are each hydrogen or $C_1$–$C_4$-alkyl, are also suitable, acrylic acid and methacrylic acid being preferred. Suitable diols are primarily aliphatic diols, in particular of 2 to 4 carbon atoms, such as ethanediol, 1,4-butanediol, 1,2-propanediol, 1,3-propanediol or mixtures of such diols, preferably a system comprising from 0.1 to 50% by weight of 1,2-propanediol and from 50 to 99.9% by weight of 1,3-propanediol, the percentages being based on the total diol weight.

Copolymers of vinyl chloride and esters of olefinically unsaturated alcohols, such as vinyl alcohol, with saturated carboxylic acids, preferably carboxylic acids of 1 to 4 carbon atoms, preferably acetic acid, are also suitable.

Such copolymers can be prepared, for example, by solution or suspension copolymerization.

The copolymers should advantageously have a vinyl chloride content of from 50 to 95, preferably from 70 to 90, % by weight and a content of the mono- or diesters of diols and α,β-unsaturated carboxylic acids of from 5 to 50, preferably from 10 to 30, % by weight, based on the material XCX. Particularly suitable are copolymers of this type which, in 15% strength by weight solution in equal amounts by volume of tetrahydrofuran and dioxane at 25° C., have a viscosity of from 20 to 80 mpa.s or a K value according to H. Fikentscher (Cellulose-Chemie 13 (1943), 58) of from 30 to 50.

Phenoxy resins, in particular those whose constitution may be described by the repeating formula

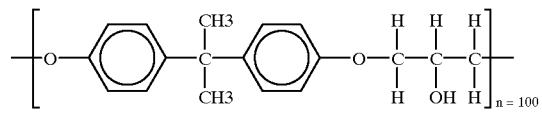

where n is preferably approximately equal to 100, may also be advantageously used. Such compounds are known, for example, under the trade names Epikote$^R$ (from Shell Chemical Co.) or epoxide resin PKHHR (Union Carbide Corporation).

Cellulose-containing binders, such as cellulose esters, in particular esterification products of cellulose with nitric acid or with carboxylic acids of 1 to 4 carbon atoms, such as cellulose acetates, for example cellulose acetate or cellulose triacetate, cellulose acetopropionate and cellulose acetobutyrate, are also suitable.

The advantageous properties of the novel magnetic recording media in comparison with those obtained using the conventional thermoplastic polyurethane elastomers are also evident when a polyfunctional isocyanate is added before application of the dispersion to the substrate. Particularly advantageous here is the use of the novel system V in combination with polyurethane elastomers which in their preferred form also carry OH groups and which contain OH-containing polyvinyl formals or the stated polyvinyl chloride copolymers. A large number of organic polyfunctional isocyanates, preferably having a molecular weight of up to 10000, in particular from 500 to 3000, may be used for crosslinking. Polyfunctional isocyanates or isocyanate-containing polymers which carry more than 2 NCO groups per molecule are preferred. Particularly suitable are polyfunctional isocyanates which are obtainable by reacting toluylene diisocyanate, hexamethylene diisocyanate or isophorone diisocyanate of the formula

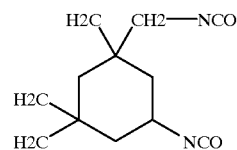

with di- or triols or by biuret or isocyanurate formation. An adduct of toluylene diisocyanate with trimethylolpropane and diethylene glycol is primarily suitable for this purpose. The molar ratio of the NCO groups of the added isocyanate component to the OH groups of the polyurethane elastomers may be from 0.5:1 to 3:1, preferably from 0.7:1 to 1.8:1, it being possible to readily determine the conditions optimum for the respective intended uses by a few simple preliminary experiments.

For the production of magnetic recording media, the ferromagnetic pigments can be dispersed in a manner known per se with a system V and, if required, additives, such as a lubricant or fillers, in the absence of a solvent or preferably in the presence of an organic diluent, it being possible for the order of addition and the added amount of the components to be readily adapted according to the intended use and ferromagnetic pigment by a few simple preliminary experiments, and said dispersion can be applied to one or both sides of a nonmagnetic substrate by means of a conventional coating apparatus, such as a knife coater or an extruder. After orientation of the ferromagnetic pigments in a strong magnetic field, the further processing can be carried out in the usual manner, for example by removing the solvent and, if the system V is crosslinkable, curing the system with final calendering under pressure and at in general from 25 to 100° C., preferably from 60 to 90° C. In the case of crosslinking polymeric materials, it has proven advantageous to carry out the calendering before the crosslinking is complete, since the OH-containing polymers in the uncrosslinked state are usually thermoplastic, without sticking. The thickness of the magnetic layer is in general from 0.5 to 20 mm, preferably from 1 to 20 mm. In the case of the production of magnetic tapes, the coated substrates are slit in the longitudinal direction and in the conventional widths generally measured in inches.

Suitable magnetic pigments are the conventional oxidic pigments, such as $\gamma Fe_2O_3$, $\gamma Fe_3O_4$, barium ferrites and $CrO_2$, or metallic pigments, such as Fe, Co and Ni. As is generally known, these pigments may contain further chemical elements or compounds.

Carboxylic acids of 10 to 20 carbon atoms, in particular stearic acid or palmitic acid, or derivatives of carboxylic acids, such as salts, esters and amides thereof, are usually used as lubricants.

Fillers, such as inorganic and organic pigments, eg. alumina, silica, titanium dioxide, carbon black, polyethylene or polypropylene, or thixotropic substances, eg. amorphous silica, are known to be used as additives.

The mixtures of ferromagnetic pigment, system V and, if required, additives or solvents serve in the usual manner as coating materials. The ratio of the ferromagnetic pigments to the system V should preferably be from 1 to 15, in particular from 3 to 10, parts of pigment per part by weight of system V. It is particularly advantageous that, owing to the excellent pigment binding power of the system V, high magnetic pigment concentrations are permitted in the magnetic layers without the mechanical-elastic properties deteriorating or the performance characteristics markedly suffering.

The coating material may contain the novel mixtures alone or mixed with other pigments or polymeric materials.

Suitable diluents are hydrocarbons, in particular toluene and cyclohexane, ketones, in particular methyl ethyl ketone and cyclohexanone, esters, in particular ethyl acetate, and ethers, in particular tetrahydrofuran or dioxane. In some cases, water is also suitable.

The conventional rigid or flexible substrates, in particular films of linear polyesters, such as polyethylene terephthalate, which generally have thicknesses of from 0.5 to 200 mm, in particular from 1 to 36 mm, may be used as nonmagnetic and nonmagnetizable substrates.

The novel magnetic recording media may contain nonmagnetic layers, such as intermediate layers, backing coatings and top layers in a manner known per se.

In the production of magnetic recording materials, a plurality of magnetic layers, of which at least one layer contains a novel system V, may be applied to the substrate.

The novel magnetic recording media are distinguished from those of the prior art by improved fine roughness of the magnetic layer surface, increased wear resistance, in particular under conditions of high temperature and humidity, and improved magnetic characteristics. As a result of this improved surface having fine roughness and the improved magnetic values, the HF output level and the chroma output level in the video range as well as the hifi output level increase substantially. A further consequence of these improved properties is a higher signal-to-noise ratio due to reduced noise, especially the modulation noise, which reduces the necessity of using even more finely divided magnetic pigments. However, the larger pigment needles can be better oriented with the same orientation effort and thus give higher residual induction and output values than finely divided magnetic pigments. Compared with the prior art, the technical complexity for dispersing, coating and orientation of the magnetic layer can thus be reduced while simultaneously achieving a high recording density.

As a result of the reduction in the dispersing effort and dispersing time as well as the high solids content of the dispersion and increased long-term stability of the dispersion, it is possible to produce novel magnetic recording media in a simple and economical manner.

In the Examples and Comparative Examples which follow, parts and percentages are by weight, unless stated otherwise.

EXAMPLE 1

1380 g of a 1:1 tetrahydrofuran (THF)/dioxane mixture, 4930 g of dioxane, 273 g of a 25% strength solution of an amino-containing polymer VI according to DE-A 44 33 931 (Example 1), 1002 g of a 15% strength solution of a cationic polymer XIV according to DE-A 42 41 506 (Example 1, polymer B in 1:1 THF/dioxane), 290 g of a 20% strength solution of a poly-vinyl chloride/polyvinyl acetate copolymer in 1:1 THF/dioxane, according to DE-A 44 45 173, 904 g of a 5% strength nitrocellulose solution in 1:1 THF/dioxane, having a K value of about 110, 1220 g of a cobalt-doped iron oxide (Hc=58 kA/m, BET surface area 26 $m^2/g$), 116 g of alumina (BET surface area 10 $m^2/g$), 113 g of a conductive carbon black (BET surface area 200 $m^2/g$) and 58 g of a fatty ester were introduced into a stirred ball mill having a capacity of 1.5 l and filled with 2.7 kg of ceramic balls having a diameter of from 1 to 1.5 mm, and dispersing was carried out for 14 hours. The dispersion was filtered under pressure and, immediately before application to a 75 mm thick polyethylene terephthalate film in a thickness of 0.8 mm when dry, was provided, while stirring, with 20 parts, based on 100 parts of dispersion, of a 50% strength solution of a triisocyanate obtained from 3 mol of toluylene diisocyanate and 1 mol of trimethylolpropane in 1:1 THF/dioxane. The film coated on both sides was dried at from 50 to 80° C. and calendered by being passed between heated rollers under pressure (nip pressure 200 kg/cm).

The results of the measurements are summarized in Table 1.

COMPARATIVE EXAMPLE 1

1380 g of a 1:1 THF/dioxane mixture, 4930 g of dioxane, 273 g of a 25% strength solution of a polymer VI according to German Application P44 00 595.4 (polymer A) in 1:1 THF/dioxane, 1002 g of a 15% strength solution of a phosphonate-containing polymer XIV according to DE-A 42 41 506 (Example 2) in 1:1 THF/dioxane, 290 g of a 20% strength solution of a polyvinyl chloride/polyvinyl acetate copolymer according to DE-A 44 45 173, 904 g of a 5% strength nitro-cellulose solution in 1:1 THF/dioxane, having a K value of about 110, 1220 g of a cobalt-doped iron oxide (Hc=58 kA/m, BET surface area 26 $m^2/g$), 116 g of alumina (BET surface area 10 $m^2/g$), 113 g of a conductive carbon black (BET surface area 200 $m^2/g$) and 58 g of a fatty ester were introduced into a stirred ball mill having a capacity of 1.5 l and filled with 2.7 kg of ceramic balls having a diameter of from 1 to 1.5 mm, and dispersing was carried out for 14 hours. The dispersion was filtered under pressure and, immediately before being applied to a 75 mm thick polyethylene terephthalate film in a thickness of 0.8 mm when dry, was provided, while stirring, with 20 parts, based on 100 parts of dispersion, of a 50% strength solution of a triisocyanate obtained from 3 mol of toluylene diisocyanate and 1 mol of trimethylolpropane in 1:1 THF/dioxane. The film coated on both sides was dried at from 50 to 80° C. and calendered by being passed between heated rollers under pressure (nip pressure 200 kg/cm).

The results of the measurements are summarized in Table 1.

COMPARATIVE EXAMPLE 2

The procedure was as in Example 2, except that the polymer VI was replaced by a commercial dispersant based on an acidic phosphoric ester of a fatty alkoxylate and the polymer XIV by a commercial polyurethane without ionic groups.

Circular flexidisks having a diameter of 3.5 inches (8.89 cm) were punched from the resulting magnetic recording medium and were subjected to the conventional tests.

The results of the measurements are summarized in Table 1.

Gloss Measurement:

The gloss measurement was carried out using a Dr. Lange reflectometer (manufacturer: Erichsen GmbH & Co.KG, Hemer-Sundwig) at an angle of 60° in accordance with the operating instructions. The dispersing is the better the higher the gloss values.

The following values were measured:

Gloss 1: Gloss value immediately after dispersing

Gloss 2: Gloss value after 24 hours on the roller stand

Gloss 3: Gloss value after the dispersion had been stored for 14 days

Window Margin:

The window margin is a relative quantity for detecting a data pulse. The higher the value, the more error-tolerant is the system with regard to detectability of the data pulse, ie. the data window.

Peak Shift:

The peak shift is the time difference between the ideal position of an individual data pulse and the actual position, measured in each case at the maximum amplitude.

EXAMPLE 2

7100 g of a 1:1 THF/dioxane mixture, 1520 g of a 50% strength solution of a polyurethane as polymer VI according to U.S. Pat. No. 4,568,612 (Example 1), having a hydroxyl number of 45 mg KOH/g in tetrahydrofuran VI, 445 g of a 25% strength solution of a cationic polymer XIV according to DE-A 44 33 931 (polymer A, Example 1) in THF, 1045 g of a 16.5% strength solution of a cationic polyurethane according to DE-A 44 45 173 (polymer B) in 1:1 THF/dioxane, 2800 g of ferromagnetic chromium dioxide having a coercive force of 50 kA/m, 1860 g of a cobalt-doped iron oxide having a coercive force of 50 kA/m, 57.4 g of a conductive carbon black, 33 g of a spherical alumina, 79 g of a metal salt of an oleic acid and 56 g of a mixture of fatty acids and fatty esters were introduced into a stirred ball mill filled with 1.08 kg of ceramic balls having a diameter of from 1 to 1.5 mm, and dispersing was carried out for 12 hours. The dispersion was filtered under pressure and, immediately before being applied to a 15 mm thick polyethylene terephthalate film, was provided, while stirring, with 0.03 part, based on 1 part of dispersion, of a 50% strength solution of a triisocyanate obtained from 3 mol of toluylene diisocyanate and 1 mol of trimethylpropane in 1:1 THF/dioxane. After being passed through a magnetic field for orienting the pigments in the running direction of the film, the coated film was dried at from 50 to 80° C. and was calendered by being passed between heated rollers under pressure (nip pressure 150 kg/cm).

The results of the measurements are summarized in Table 2.

COMPARATIVE EXAMPLE 3

The procedure was as in Example 2, except that the polyurethane was replaced by the polyurethane according to DE-A 44 45 173 (polymer A).

After the coated film had been slit into ½ inch (12.7 mm) wide tapes, the electroacoustic and video data and the mechanical tape properties were measured. Tape VRT2 (reference point 0 dB) from Victor Company of Japan was used as a reference tape for electroacoustic data.

The measured values in Table 2 have the following meaning:

HF output level:

High-frequency output level

Video signal-to-noise ratio S/N:

Ratio of the luminance signal (brightness signal) of a 100% white image to the noise level.

SCM:

Spurious color modulation

TABLE 1

| | Example | Comp. Ex. 1 | Comp. Ex. 2 |
|---|---|---|---|
| Dispersing time [h] | 10 | 12 | 20 |
| Gloss 1 | 88 | 84 | 58 |
| Gloss 2 | 88 | 80 | 31 |
| Gloss 3 | 86 | 78 | 30 |
| Surface defects: | | | |
| After dispersing | 0 nodules/mm$^2$ | 0 nodules/mm$^2$ | 2 nodules/mm$^2$ |
| After 3 days | 0 nodules/mm$^2$ | 3 nodules/mm$^2$ | 6 nodules/mm$^2$ |
| After 7 days | 1 nodule/mm$^2$ | 10 nodules/mm$^2$ | 10 nodules/mm$^2$ |

TABLE 2

| | Example 2 | | | Comparative Example 3 | | |
|---|---|---|---|---|---|---|
| Coating | after dispers. | after 3 days | after 7 days | after dispers. | after 3 days | after 7 days |
| HF output level | 2.3 | | | 1.6 | | |
| S/N | 2.7 | | | 2.1 | | |
| SCM | −2.4 | | | −3.5 | | |
| Abrasion on video-head | 1 | 1 | 1.5 | 1 | 1.5 | 2 |
| Nodules/mm$^2$ | 0 | 1 | 2 | 1 | 4 | 15 |
| Gloss | 97 | 96 | 95 | 96 | 89 | 85 |

We claim:

1. A magnetic recording medium I containing a nonmagnetic substrate II and a magnetizable layer III, the magnetizable layer III containing ferromagnetic pigments IV and a system of polymeric materials V, wherein the system of polymeric materials V contains
   a) from 3 to 35% by weight of a polymer VI obtainable by reacting
      1) a polymer VII of
         a) from 80 to almost 100 mol % of a $C_1$–$C_{25}$-alkyl ester of an α,β-unsaturated carboxylic acid,
         b) from 0 to 20 mol % of one or more further monomers and c) an initiator and/or regulator, by means of which the majority of the polymer chains of the polymer VII are terminated at one of their ends by a hydroxyl group, 2) with a polyfunctional nonaromatic isocyanate VIII to give a reaction product IX, the amount of isocyanate groups being from 1.2 to 3.9 mol per mole of hydroxyl groups of VII, 3) reacting IX with
   a) a compound X containing groups reactive toward isocyanates to give a reaction product XI, the amount of reactive groups being from 2 to 7 mol per mole of the free isocyanate groups still present in IX, and reacting XI with a compound XII to give the polymer VI, which reacts with the still free reactive groups in XI and by means of which ionic or ionogenic groups are introduced into XI, or
   b) a compound XIII which contains groups reactive toward isocyanates and by means of which ionic or ionogenic groups are introduced into IX, to give the polymer VI and b) from 5 to 97% by weight of a polymer XIV which contains basic groups, has a molecular weight of from 30000 to 2000000 and is obtainable by reacting
   1) a polymeric diol XV having a number average molecular weight of from 400 to 10000 with
   2) from 0.3 to 1 mol, per mole of the diol XV, of a diol XVI of 2 to 18 carbon atoms and
   3) from 0.01 to 1 mol, per mole of the diol XV, of a polyhydric alcohol XVII having at least three OH groups and 3 to 25 carbon atoms,
   4) from 1.3 to 13 mol, per mole of the diol XV, of a diisocyanate XVIII of 6 to 30 carbon atoms and
   5) from 0.09 to 2 mol, per mole of the diol XV, of an amino alcohol XIX of 2 to 16 carbon atoms, the ratio of the sum of OH groups of the compounds XV, XVI and XVII to the NCO groups of the compound XVIII to the amine groups of the compound XIX being 1:1.03–1.3:0.03–0.3, and the sum of the amounts by weight of the polymers VI and VII in the system V being from 40 to 100% by weight.

2. A magnetic recording medium I as claimed in claim 1, containing a system comprising polymeric materials V, the system comprising polymeric materials V containing
   a) from 5 to 25% by weight of a polymer VI,
   b) from 15 to 60% by weight of a polymer XIV and
   c) from 15 to 60% by weight of a polymeric material XX without ionic or ionogenic groups, selected from the group consisting of polyurethanes, polyvinyl chloride, polyvinyl formals, polyvinyl chloride/polyvinyl formal copolymers, phenoxy resins, nitrocellulose, cellulose esters of organic carboxylic acids and mixtures of such compounds, based on the total weight of the system V.

* * * * *